United States Patent [19]

Rademachers et al.

[11] 3,983,221

[45] Sept. 28, 1976

[54] PRODUCTION OF BASIC ALUMINIUM NITRATE SOLUTION

[75] Inventors: Jakob Rademachers; Peter Woditsch; Henning Erfurth; Bernd Holle, all of Krefeld; Wilhelm Schnell, Mettmann, all of Germany

[73] Assignee: Bayer Aktiengesellschaft, Leverkusen, Germany

[22] Filed: Mar. 31, 1975

[21] Appl. No.: 563,761

[30] Foreign Application Priority Data

Apr. 23, 1974 Germany............................ 2419453

[52] U.S. Cl. ............................................... 423/395
[51] Int. Cl.² ........................................... C01F 7/66
[58] Field of Search ........... 423/395, 132, 626, 631; 252/313 R, 317

[56] References Cited
UNITED STATES PATENTS

| | | | |
|---|---|---|---|
| 2,931,706 | 4/1960 | Gresky et al....................... | 423/395 |
| 3,340,205 | 9/1967 | Hayes et al. .................... | 252/313 R |
| 3,535,268 | 10/1970 | Hayes ............................. | 252/317 X |

OTHER PUBLICATIONS

Mellor: *A Comprehensive Treatise on Inorganic & Theoretical Chem.;* Longmans, Greene & Co.; Lon.; 1924; vol. 4 pp. 212–213.

"Chemical Abstracts", vol. 47, 1953, p. 6227b.

"Chemical Abstracts" vol. 62, 1965, p. 2525.

*Primary Examiner*—G. O. Peters
*Attorney, Agent, or Firm*—Burgess, Dinklage & Sprung

[57] ABSTRACT

A process for the production of basic aluminum nitrate solutions by reacting metallic aluminum with nitric acid, comprising establishing a body of metallic aluminum, supplying additional aluminum to said body, supplying to said body countercurrent to the supply of the additional aluminum nitric acid of a concentration of about 5 to 30% by weight having basic aluminum nitrate dissolved therein and a pH of about 1 to 4, maintaining said body at a temperature of from about 30°C up to the boiling point of the nitric acid, whereby the aluminum reacts with the nitric acid, and removing solution containing reaction product adjacent the point of supply of the additional aluminum and remote from the point of supply of the nitric acid.

8 Claims, 1 Drawing Figure

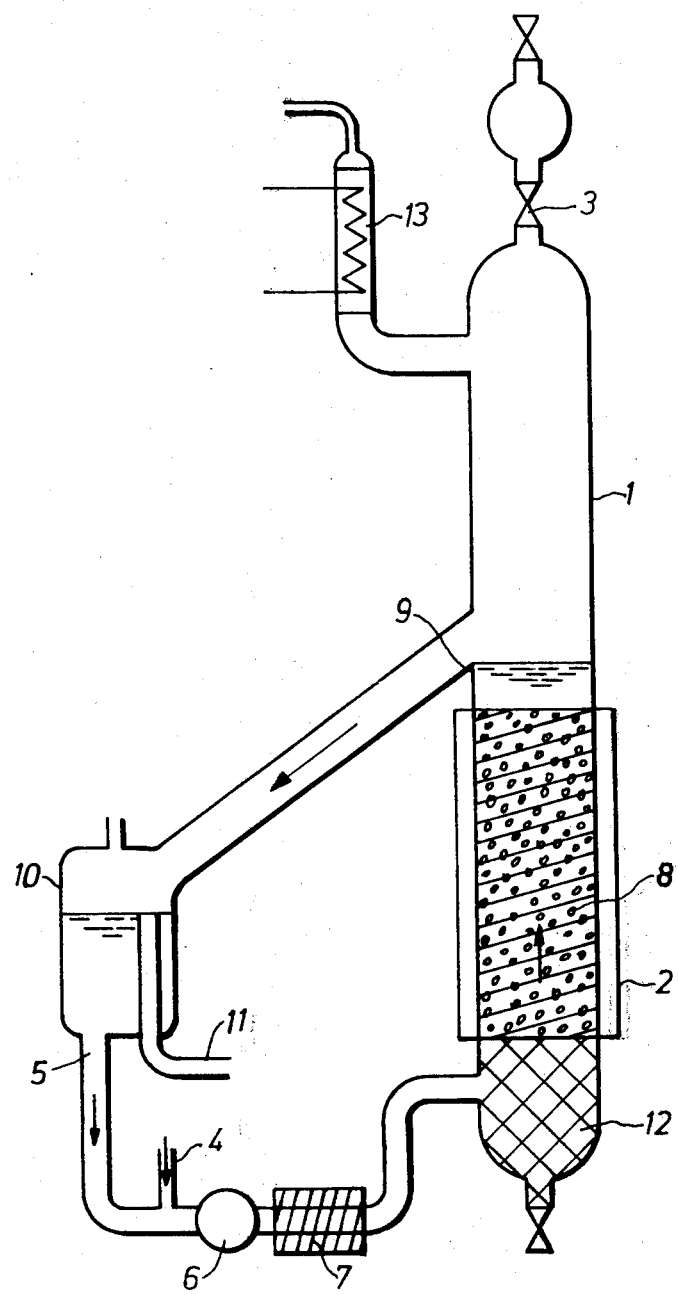

PRODUCTION OF BASIC ALUMINIUM NITRATE SOLUTION

This invention relates to a process for the continuous production of basic aluminum nitrate solutions by reacting metallic aluminum with nitric acid under conditions which preclude the formation of a non-explosive waste gas.

In the context of the invention, basic aluminum nitrate solutions are solutions of salts of aluminum corresponding to the general formula:

$$Al(OH)_{3-x}(NO_3)_x$$

in which $x$ has values of about 0.5 to 2.0. The basicity of compounds such as these is dependent on the ratio of the hydroxyl groups to the nitrate groups.

It is known from the literature that basic aluminum salts can be obtained by reacting aluminum with acids (Gmelins Handbuch der Anorg. Chemie, 8th Edition, No. 35, AC, part B, pages 117 – 125, 156, 205 – 206, (1934).

German DAS No. 1,767,799 describes a process for the production of basic aluminum chlorides with a molar Al:Cl-ratio of from 0.32 to 1.5. This process starts with aluminum granules which are treated with a mixture of hydrochloric acid and basic aluminum chloride sol under special reaction conditions. The hydrogen formed during the reaction is used to maintain an excess pressure in the reaction column in order to keep the sol in liquid form. It is possible by this process to obtain, from Al and HCl basic aluminum chlorides corresponding to the general formula:

$$Al_2(OH)_{6-n}Cl_n$$

in which $n = 0.64$ to 3.0, the reaction being accompanied by the formation of hydrogen.

U.S. Pat. No. 3,020,242 relates to another possible method for preparing high molecular weight basic aluminum chloride solutions. In this process, aluminum is reacted with concentrated hydrochloric acid in batches in a digestion vessel until the solution has an aluminum concentration of about 13 to 15% by weight. The basic aluminum chloride sol is separated off and the high molecular weight sol polymers are depolymerized in a second depolymerization vessel to which hydrochloric acid is added. The degraded, basic aluminum chloride is pumped back into the digestion zone where it is reacted again.

The production of basic aluminum chloride solutions of the composition:

$$Al_2(OH)_{6-n}Cl_n,$$

in which $n = 1$ to 5, is described in German DOS No. 2,048,273. In this process, aluminum chips are introduced into a reactor into which a 5 to 15% hydrochloric acid is continuously pumped. The spent aluminum chips are replaced. The reaction is accompanied by the vigorous evolution of hydrogen, the hydrochloric acid boiling in the upper parts of the reactor. The HCl given off is condensed by means of a reflux condenser and returned to the reactor. The progressive dilution of the hydrochloric acid causes the reaction to abate in the lower parts of the reactor, with the result that heat has to be applied by means of an electrical heating system.

German DOS No. 1,592,182 relates to another process for the production of pure aluminum oxide sols from an impure aluminum starting material. In this process, the metallic aluminum is incompletely dissolved by digestion with an aqueous acid and an aluminum oxide sol formed in admixture with slag metal particles containing the impurities in a concentration which is considerably greater than in the reaction mixture. A proportion of these slag metal particles is continuously removed from the digestion zone, the metal particles are separated off and the sol is returned. The reaction is continued until the sol has the required composition. The conversion can be monitored by the quantity of hydrogen formed. The advantage of this process is its purifications effect obtained by enriching impurities in the aluminum as the reaction progresses, separating them off and removing them from the process. Unfortunately, this process is accompanied by heavy losses of aluminum $Al_2O_3$-sols with a high aluminum oxide content coupled with a low viscosity can be obtained by the process disclosed in U.S. Pat. No. 2,859,183. In this process, aluminum is melted at high temperatures and added dropwise to a dilute, aliphatic carboxylic acid in the presence of an amalgamating agent. Aluminum is thus formed in an extremely reactive form and reacts quickly to form basic aluminum hydroxide sols containing carboxylic acid, the reaction being accompanied by the evolution of hydrogen.

One factor common to all the processes known from the literature for producing basic aluminum oxide or aluminum hydroxide sols from metallic aluminum and corresponding acids is the evolution of hydrogen. The formation of hydrogen necessitates special safety measures.

The preparation of basic aluminum nitrate solutions proceeds fundamentally differently from what might have been expected by analogy to known processes for the preparation of basic aluminum chloride solutions. The reaction of aluminum with nitric acid is not accompanied by the formation of hydrogen alone, but instead gaseous mixtures of hydrogen, oxygen and nitrous gases are formed. Mixtures of this kind are explosive even with a hydrogen content of as low as about 5% by volume (M. J. van der Wal, Rec. trav. chim. Pays-Bas, 53, 97 (1934). Where nitric acid is used, therefore, the aluminum is oxidized not only be the protons of the acid, but also by nitrate ions. As will be shown hereinafter in Example 1, the gas mixtures formed are extremely dangerous and explode on ignition. The gas zone can also be shown to contain the following compounds as reaction products: NO, $N_2O$, $N_2$ and small quantities of $NO_2$. The proportion of hydrogen in the reaction gas can be as much as 20% by volume.

The object of the present invention is to provide a process for the preparation of basic aluminum nitrate solutions in which the formation of hydrogen is suppressed as far as possible and the formation of elemental nitrogen is promoted so that a non-explosive waste gas is formed. Another object of the invention is to prepare basic aluminum nitrate solutions under such conditions that no higher-polymer fractions are formed. If an attempt is made to depolymerize, by the addition of nitric acid, a basic aluminium nitrate solution which has already become slightly hazy through the presence in it of some highly basic sol particles, the high-polymer constituents flocculate out to form a white, insoluble deposit.

Accordingly, the present invention relates to a process for the preparation of basic aluminum nitrate solutions by reacting metallic aluminum with nitric acid, which is distinguished by the fact that aluminum metal is reacted with nitric acid and with a concentration of about 5 to 30% by weight in the presence of basic aluminum nitrate at pH-values in the range of from about 1 to 4 and at temperatures in the range of from about 30°C up to the boiling temperature of the reaction solution, the aluminum metal and the nitric acid containing basic aluminum nitrate solution being contacted in countercurrent.

Since the formation of fairly heavily aggregated or polymerized basic aluminum nitrate solutions has to be prevented from the outset, it is necessary even at the preparation stage, to adopt a procedure which ensures that no excessive concentration of dissolved aluminum can be built up. According to the invention, this object is achieved by carrying out the reaction in such a way that, throughout the entire layer of aluminum granules, the pH-value, the temperature, the concentration of basic aluminum nitrate and basicity, i.e., the ratio of $NO_3$ to Al, are substantially in equilibrium.

In one particular embodiment of the process according to the invention, which enables the aluminum freshly introduced to age in already formed, basic aluminum nitrate solution before the aluminum metal comes into contact with nitric acid, maintaining the parameters according to the invention has proved to be essential to the composition of the reaction gases by suppressing the evolution of hydrogen and promoting the formation of elemental nitrogen.

This special embodiment of the process according to the invention is described with reference to the accompanying drawing, in which the FIGURE is a schematic longitudinal section through an apparatus for carrying out the process.

In the drawing, the reference 1 denotes a reaction tube, the reference 2 denotes cooling and heating facilities, the reference 3 denotes a trap or lock, the reference 4 denotes a pipe for the addition of nitric acid, the reference 5 denotes a pipe for the return of aluminum nitrate, the reference 6 denotes a pump, the reference 7 denotes a heat exchanger, the reference 8 denotes a packing of aluminum granules, the reference 9 denotes an overflow, the reference 10 denotes a preliminary separator, the reference 11 denotes a pipe for removal of a component stream of basic aluminum nitrate, the reference 12 denotes Raschig rings and the reference 13 denotes a waste-gas pipe.

The process according to the invention and the apparatus illustrated in the drawings operate as follows:

A vertically arranged reaction tube 1, provided with cooling and heating facilities 2 for accurately controlling the temperature throughout the entire reaction zone, is filled with aluminum granules introduced through the lock 3. Nitric acid supplied at 4 along with recycled, basic aluminum nitrate supplied at 5 is introduced into the reaction tube from below by means of the pump 6. Before entering the reaction tube, the nitric acid is mixed with basic aluminum nitrate solution, heated to a temperature in the range of from 40° to 100°C in a heat exchanger 7 and pumped through the column at an empty tube speed of from 5 to 50 cm per minute, preferably from 20 to 40 cm per minute. The rate of circulation of the mixture of nitric acid and basic aluminum nitrate solution is measured above and below the packing 8 of aluminum granules. The rate of circulation is adjusted in such a way that the pH-range of from 1 to 4, preferably from 2.5 to 3.8, applied in accordance with the invention is maintained. The residence time of the acid in the column is as long as is required to ensure that the aluminum granules introduced continuously into the column from above or in batches at short time intervals have time to age before they come into contact with free nitric acid.

It is important that contact between the aluminum grains freshly added and the free acid should be preceded by a period of ageing. This effect is obtained by a low concentration of hydrogen ions and by the presence of large quantities of reaction gas in the upper parts of the reactor. For example, the evolution of reaction gas at a pH-value in the range of from about 1 to 4, maintained in accordance with the invention, amounts to between about 0.25 and 3.0 liters per hour throughout the entire reaction zone. The basic aluminum nitrate solution is run off from the column through an overflow 9 which, relative to the aluminum bed, is adjacent the point of supply of additional aluminum and remote from the point of supply of the nitric acid. The overflowing solution is introduced into a preliminary separator 10 from which a component stream is run off at 11 as product while another component stream is added at 5 in accordance with the invention to the nitric acid before it comes into contact with the aluminum metal. The body of aluminum granules can rest on a layer of glass Raschig rings 12. The waste gas leaves the reactor after passing through a condenser 13 and may subsequently be worked up in a purifying plant (not shown). The concentration of the nitric acid introduced is preferably in the range of about 10 to 30% by weight of $HNO_3$. The ratio of recycled, basic aluminum nitrate solution (expressed as $HNO_3$) to nitric acid is adjusted to values in the range of about 10 to 150 : 1, preferably about 20 to 80 : 1.

The basicity of the basic aluminum nitrate solutions prepared and, hence, the value of $x$ in the general formula:

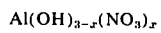

$$Al(OH)_{3-x}(NO_3)_x$$

may be adjusted through the pH-value at which the reaction is carried out. The more basic the aluminum nitrate prepared, the higher the pH-value of the reaction solution issuing from the column. However, the pH-value should not exceed about pH 4. The concentration of the basic aluminum nitrate solutions prepared can be controlled by adjusting the concentration of the nitric acid used in reaction, the concentration of the basic aluminum nitrate solution increasing with increasing nitric acid concentration. It is possible by the process according to the invention to prepare up to about 2 molar basic aluminum nitrate solutions corresponding to the formula:

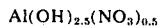

$$Al(OH)_{2.5}(NO_3)_{0.5}$$

Basic aluminum nitrate solutions of this kind are the most unstable of the compounds represented by the general formula:

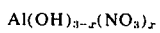

$$Al(OH)_{3-x}(NO_3)_x$$

with values for $x$ in the range of about 0.5 to 2.0, so that, with higher values for $x$, i. e., with less basic aluminum nitrate solutions, it is possible to prepare even more concentrated solutions.

The nitric acid-containing basic aluminum nitrate solution is delivered to the reaction tube at a rate corresponding to the state of the reaction of the aluminum granule packing and to the conversion, in other words the quantity of acid is measured in such a way that, after one passage through the column, the required pH-value of the completed aluminum nitrate solution is again obtained. The conversion is largely determined by the temperature pattern prevailing in the column. In the case of basic aluminum nitrate solutions with a molar $NO_3$: Al-ratio of about 0.5 to 2.0, the pH-value is in the range of about 2.8 to 3.8. The nitric acid is added to the recycled, basic aluminum nitrate solution in such a way that the pH-value does not fall below about 1.0. Basic aluminum nitrate is added to the nitric acid before its reaction with the aluminum preferably in such a quantity that the pH-value of the mixture is in the range of from about 2.5 to 3.5.

It has also surprisingly been found that the gas composition of the waste gas and the quantity of gas can be controlled through the temperature selected in the reaction solution. The reaction temperature in the reaction solution should not fall below about 30°C and should not exceed the boiling point of the reaction solution. A reaction temperature in the range of about 40° to 100°C is preferred. The NO-content of the waste gas decreases while the proportion of elemental nitrogen increases with decreasing temperature. Effective utilization of the installation can be greater with decreasing temperature given a relatively tall column packing because, with less waste gas, there is a lower gas load at the head of the column per kg of aluminum reacted. One limiting factor to the capacity of a particular installation is the quantity of gas given off in the column per unit cross-section. If this volume of gas exceeds a certain value, the aluminum granules begin to be whirled around and are discharged with the reaction solution which then undergoes heavy foaming. As a result, aluminum is lost for the further reaction, blocks valves and, if it gets into the pump circuit, can give rise to corrosion and destruction of the pumps. The conditions are preferably selected in such a way that, for every mole of aluminum reacted, no more than about 0.6 $Nm^3$, preferably about 0.25 to 0.4 $Nm^3$, of reaction gas is formed. The dimensions of the reactor should be such that the quantity of gas does not exceed an upper limit of 5 liters per $cm^2$ per hour, the reactor preferably working under a gas load of about 0.25 to 2.5 liters per $cm^2$ per hour.

One preferred embodiment of the process according to the invention is carried out with aluminum granules having an iron content of up to about 0.5% by weight, preferably about 0.1 to 0.3% by weight. With an aluminum starting material of this kind, the evolution of hydrogen is reduced and the reaction velocity is positively influenced.

Basic aluminum nitrate solutions are of interest in a number of applications, because the aluminum hydroxides or aluminum oxides obtainable from them are particularly suitable for use as binders in the production of refractory moldings and heat-resistant oxide compositions. Other fields of application include absorbents, catalysts or their supports. Aluminum hydroxides prepared from basic aluminum nitrate solutions are particularly suitable for coating inorganic pigments (German DOS No. 2,206,776). Other fields of application for basic aluminum nitrate solutions include precipitation and flocculation reactions in the treatment of sewage. Aluminum hydroxides produced from them have a particularly high adsorption activity which makes them suitable for purification purposes.

The process according to the invention is illustrated in the following Examples.

COMPARISON EXAMPLE

Preparation of a basic aluminum nitrate solution in a descending stream of acid

A 650 mm long glass tube with an internal diameter of 65 mm, closed at its upper end with a standard ground closure, was used as the reactor for producing basic aluminum nitrate. The associated ground glass stopper was provided with two ground glass sockets to one of which a reflux condenser was fitted, while the nitric acid was introduced through the other by means of a diaphragm pump. The ground glass stopper was provided with an additional ground glass inlet for introducing the aluminum granules (6 to 12 mm diameter). A sieve plate was fused into the glass tube at its lower end for receiving the aluminum granules. A syphon tube with ventilation was fused on below the sieve plate for running off the basic aluminum nitrate solution. After passing through a pH-measuring zone, the solution flowed into a storage vessel. The lower third of the reactor was surrounded by an adjustable, electrical heating band. A cock was fused onto the lower end of the glass tube for removing residues of aluminum and aged, insoluble fractions of product.

The reactor was filled with 1500 g of aluminum granules (99.7% aluminum, the rest mainly iron) and 980 ml of 2.25 N $HNO_3$. By means of the electrical heating band, the reactor was heated until the reaction started. The heating band was then switched back again to its lowest level. By means of the diaphragm metering pump, 240 ml/h of 2.25 N $HNO_3$ were introduced into the reactor. The hourly consumption of aluminum amounted to approximately 12 g. The basic aluminum nitrate solution run off had the composition $Al(OH)_{2.5}(NO_3)_{0.5}$ (47.8 g of Al per liter, 67.1 g of $NO_3$ per liter and 4.0 g of $NH_4^+$ per liter). The pH-value amounted to 3.85. Waste gas accumulated at a rate of approximately 6.3 liters per hour, the average hydrogen content of the waste gas amounting to 9.4% by volume. The gas mixture exploded on spark ignition.

EXAMPLE 2

The apparatus illustrated in the drawing was used. The basic aluminum nitrate solution was introduced into the reactor from below together with nitric acid (temperature about 63° to 66°C) at an empty tube speed of 40 cm per minute, and was circulated by means of a pump. The solution was pump-circulated at a rate of 1 $m^3$ per hour. The circuit consisted essentially of the reaction 1 (capacity up to overflow approximately 160 liters), a settling vessel 10 with a capacity of 150 liters and a pump 6. During operation, the end product was run off from the settling vessel through the overflow 11, collecting in a storage tank. The bed of granules 8 in the reactor had a height of 1900 mm and rested on a layer of glass Raschig rings 12 denoted by the cross-hatching. The aluminum had a purity of 99.7 to 99.8 percent (the rest mainly iron). 22 Liters per hour of fresh nitric acid (14.5 percent) were continuously introduced into the circuit at 4. The temperature in the reactor was kept at about 71° to 75°C by steam heating six titanium tubes in the granule bed 8. The aluminum (850 g/h) was introduced into the reactor through the lock 3 in the form of granules 6 to 12 mm in diameter. The product continuously run off from the settling vessel through the overflow 9 had a pH-value of 3.40. The solution contained 38.6 g/l of aluminum, 97.3 g/l of nitrate and 1.2 g/l of ammonium ion. Accordingly, the aluminium nitrate has the following composition: $Al(OH)_{1.95}(NO_3)_{1.05}$.

The reaction gas had the following composition:

| | | |
|---|---|---|
| $N_2O$ | 10.7% | by volume |
| $NO + NO_2$ | 39.6% | by volume |
| $N_2$ | 48.8% | by volume |
| $H_2$ | 0.9% | by volume. |

After passing through the reflux condenser 13, the waste gas was cleaned in a purifying installation.

In contrast to Example 1, so little hydrogen was formed in this case that the reaction gas could no longer be ignited.

EXAMPLE 3

A basic aluminum nitrate solution containing 35 g of aluminium per liter was circulated, and flowed through the reaction column at a rate of 30 cm per minute. A 14% $HNO_3$ was continuously introduced into the pump circuit at a rate of 1.965 liters per hour, and the aluminum nitrate/$HNO_3$ mixture was introduced into the reactor from below against the hydrostatic pressure of the filled column. The temperature at the lower end amounted to 90°C and rose at the overflow to 97°C. The pH-value at the reactor inlet was 3.15, rising to 3.23 at the reactor outlet. 1.921 l/h of a basic aluminum nitrate solution of the following composition were obtained:

35.0 g of Al/l
2.3 g of $NH_4^+$/l
80.2 g of $NO_3$/l

Accordingly, the molar $NO_3^-$/Al-ratio amounted to 0.897 (only taking into consideration nitrate bound to aluminum). The waste gas, whose composition is shown in Table 1, was not explosive and only contained 0.2% of elemental hydrogen. Aluminum was continuously delivered to the reaction column from above at the same rate it was consumed.

EXAMPLE 4

The procedure was as described in Example 3. 1.353 Liters per hour of an 18.7% $HNO_3$ produced 1.315 liters per hour of a basic aluminum nitrate solution containing 56.8 g of Al per liter 2.7 g of $NH_4^+$ per liter and 90.4 g of $NO_3$ per liter. The molar nitrate/Al-ratio amounted to 0.623 and the pH-value of the end product to 3.35. The quantity and composition of the waste gas are shown in Table 1.

EXAMPLE 5

The procedure was as described in Example 3, except that the rate of circulation of the basic aluminum nitrate solution was reduced to 10 cm per minute. The inlet temperature at the lower end of the reactor was only 83°C, while the inlet pH-value amounted to 3.05. The temperature and pH-value increased over the entire height of the reactor and, at the outlet end of the reactor, reached 96.2°C and pH 3.30, respectively. The throughput amounted to 1.544 liters per hour of 14.2% nitric acid. A basic aluminum nitrate solution with a molar $NO_3$ : Al-ratio of 0.794 and an aluminum content of 38.7 g per liter was formed. As in the preceding Examples, the hydrogen content of the waste gas amounted to less than 0.2% by volume.

EXAMPLE 6

0.64 l/h of nitric acid (14.2%) were added to a basic aluminum nitrate solution. The mixture of solution and acid flowed through the reactor at a rate of 10 cm per minute, the inlet temperature was 67°C and the outlet temperature 69°C. The pH-value rose within the reaction zone to a value of from 3.3 to 3.4. The aluminum nitrate solution produced (0.63 l/h) contained 44.3 g of Al per liter in addition to 76 g of $NO_3$ per liter and 2.6 g of $NH_4^+$ per liter.

The molar $NO_3^-$/Al-ratio was 0.63. The quantity of waste gas formed per kg of aluminum used amounted to only 0.30 $Nm^3$ and contained only small quantities of hydrogen, viz. 0.3% by volume.

It will be appreciated that the instant specification and examples are set forth by way of illustration and not limitation, and that various modifications and changes may be made without departing from the spirit and scope of the present invention.

Table 1

| | Composition of the waste gases in the reaction of $HNO_3$ with Al | | | | | |
|---|---|---|---|---|---|---|
| Example | Quantity of waste gas ($Nm^3$/kg of Al) | $H_2$ (% by volume) | NO (% by volume) | $N_2O$ (% by volume) | $N_2$ (% by volume) | Others |
| 1 | 0.53 | 9.4 | n. d. | n. d. | n. d. | n. d. |
| 2 | 0.30 | 0.9 | 39.6 | 10.7 | 48.8 | |
| 3 | 0.51 | 0.2 | 78.0 | 8.0 | 13.2 | 0.6 |
| 4 | 0.49 | 0.2 | 67.9 | 13.2 | 17.1 | 1.6 |
| 5 | 0.45 | 0.2 | 75.3 | 11.5 | 12.4 | 0.6 |
| 6 | 0.30 | 0.3 | 33.0 | 40.2 | 25.4 | 1.1 | n. d. = not determined

What is claimed is:

1. A process for the production of basic aluminum nitrate solutions by reacting metallic aluminum with nitric acid, comprising establishing a body of metallic aluminum, supplying additional aluminum to said body, supplying to said body countercurrent to the supply of the additional aluminum nitric acid of a concentration of about 5 to 30% by weight having basic aluminum nitrate dissolved therein and a pH of about 1 to 4, maintaining said body at a temperature of from about 30°C up to the boiling point of the nitric acid, whereby the aluminum reacts with the nitric acid, and removing solution containing reaction product adjacent the point of supply of the additional aluminum and remote from the point of supply of the nitric acid.

2. A process as claimed in claim 1, wherein the aluminum is used in the form of granules of a diameter of about 2 to 20 mm.

3. A process as claimed in claim 1, wherein the removed solution has a pH of about 2.5 to 3.8.

4. A process as claimed in claim 1, wherein the temperature is about 40° to 100°C.

5. A process as claimed in claim 1, wherein the body of metallic aluminum is established in a tube and the nitric acid containing basic aluminum nitrate is supplied to the tube at an empty tube speed of about 5 to 50 cm per minute.

6. A process as claimed in claim 1, wherein basic aluminum nitrate is added to the nitric acid before its reaction with the aluminum metal in such a quantity that the pH of the mixture is about 1 to 3.5.

7. A process as claimed in claim 1, wherein the aluminum metal has an iron content of up to about 0.5% by weight.

8. A process as claimed in claim 4, wherein the aluminum has an iron content of about 0.1 to 0.3% by weight and is used in the form of granules of a diameter of about 6 to 12 mm, the body of metallic aluminum is established in a tube and the nitric acid containing basic aluminum nitrate is supplied to the tube at an empty tube speed of about 5 to 50 cm per minute, the basic aluminum nitrate being added to the nitric acid before reaction with the aluminum metal in such a quantity that the pH of the mixture is about 2.5 to 3.5, the pH of the removed solution ranging from about 2.5 to 3.8.

* * * * *